March 14, 1950 G. E. CONWAY 2,500,485
ROTARY REDUCED SPEED POWER TRANSMISSION
Filed Feb. 3, 1948

INVENTOR.
George E. Conway
BY
Louis Barnett
Attorney

Patented Mar. 14, 1950

2,500,485

UNITED STATES PATENT OFFICE 2,500,485

ROTARY REDUCED SPEED POWER TRANSMISSION

George E. Conway, Cresskill, N. J.

Application February 3, 1948, Serial No. 6,000

2 Claims. (Cl. 74—421)

This invention relates to speed reducing power transmission aparatus for providing a slow speed rotary drive, and more particularly is directed to an improved unitary compact take-off power transmission having power rotary drive of relatively slow speed reduced from a higher speed rotary driving power source.

Among the objects of the invention is to provide an improved apparatus of the character described which shall comprise few and simple parts that are easily assembled to form a unitary compact rugged construction, which can be readily installed in limited power transmission space such as may be required for conveying and elevating machinery, which shall require a minimum of maintenance service, which shall be capable of providing a relatively wide range of speed reduction ratios, which shall be conveniently adaptable for various types and sizes of take-off drives such for example, as belt or cable pulleys, chain sprockets, or the like, and which shall be efficient and practical to a high degree in use.

Other objects of this invention will in part be obvious and in part hereinafter pointed out. The invention accordingly consists of features of construction, combination of elements and arrangement of parts which will be exemplified in the construction hereinafter described and of which the scope of the application will be indicated in the following claims.

Figure 1:
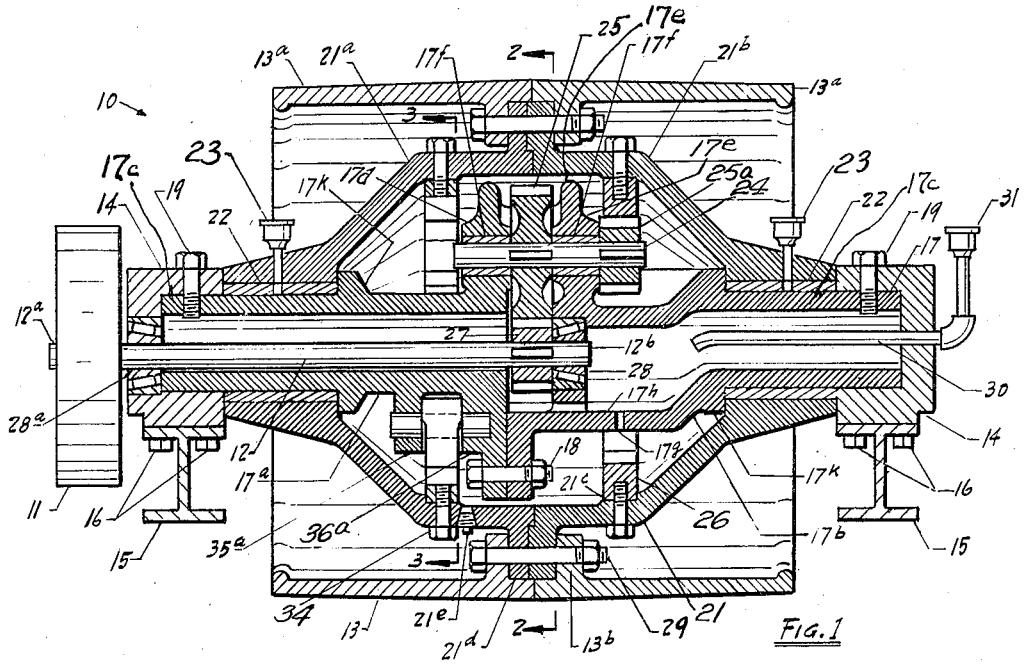

In the accompanying drawing in which are shown varlious illustrated embodiments of the invention:

Fig. 1 is a cross sectional view taken through an improved rotary power transmission apparatus constructed to embody the invention having a take-off drive of relatively slow speed reduced from a higher speed driving power source, as for example, a driving pulley shown.

Figure 4:
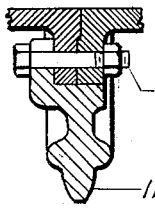
Figure 5:
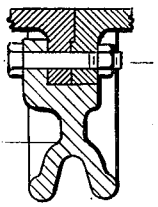
Figure 2:
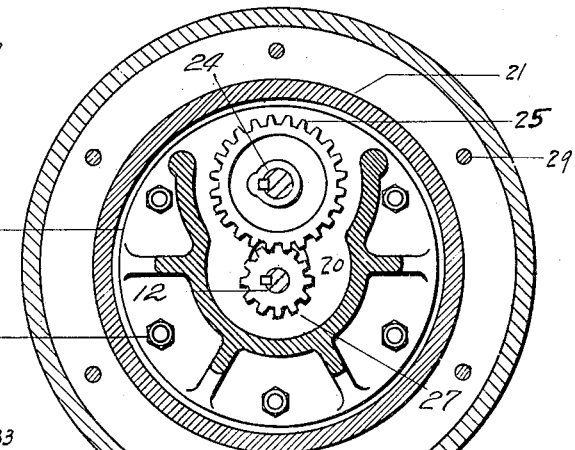
Figure 3:
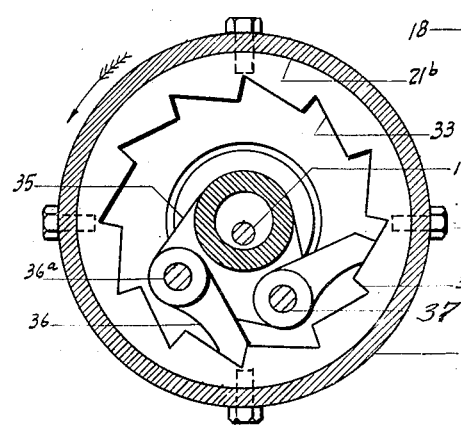

Figs. 2 and 3 are cross-sectional views taken on lines 2—2 and 3—3 in Fig. 1, respectively, showing the construction of the interior assembly, Fig. 3 showing in detail a pawl and circular ratchet one-way rotation limiting feature, and Figs. 4 and 5 are fragmentary sectional views showing the chain sprocket and sheave or grooved cable pulley power take-off constructions, respectively, which can conveniently replace the belt pulley structure of the take-off drive shown in Fig. 1.

Referring in detail to the drawing, 10 denotes an improved rotary power transmission apparatus constructed to embody the invention having a suitable rotary power drive such as any conventional type of prime mover power source, for example, an electric motor, gas engine or the like, (not shown) or driving pulley 11 rotated by such prime mover and mounted to turn a horizontally disposed power shaft 12, the latter being normally rotated at a relatively high speed.

In aparatus 10 constructed as shown in Fig. 1, a relatively slow speed take-off belt pulley 13 may be utilized to operate conveying or elevating machinery, of any well understood construction (not shown), or for other purposes requiring a relatively slower speed than the normal rotary speed provided by said power source through driving pulley 11 and power shaft 12. To this end there is provided, a pair of spaced bearing blocks 14, rigidly supported on a suitable foundation, such as structural steel I-beams 15 to which blocks 14 are bolted as at 16. Mounted to extend horizontally between said blocks 14 there is provided an elongated sectionalized sleeve or hollow stationary shaft 17, sections 17a and 17b of which when disassembled split said sleeve shaft 17 at flanged portions midway from the ends thereof. As shown in Figs. 1 and 2, said flanged portions are rigidly secured together by spaced apart connecting bolts 18 to provide a continuous spanning structure with the power shaft 12 extending through section 17a, and driving pulley 11 positioned to overhang on outer end 12a of said shaft 12 just beyond bearing block 14. Sleeve shaft 17 is held as a rigid unit against rotation by any suitable means, such as, set bolts 19 clamping the opposite outer ends of said sections 17a and 17b in fitted position to bearing blocks 14.

Pulley 13 may be formed of identical halves 13a, and is rotatably mounted by means of a casing or shell structure 21 on sleeve shaft 17 between the spaced bearing blocks 14, said pulley 13 and casing structure 21 being driven from power shaft 12 through suitable sets of a gear transmission 20 housed within said casing structure 21. The latter may be a two-part construction 21a and 21b, each provided with suitable anti-friction liner bearings 22 spaced apart in the assembly to serve as journals for said rotation with said pulley 13 on sleeve shaft 17. Said liner bearings 22, when of the type shown in Fig. 1, each may be lubricated in any well understood manner as by means of grease cup 23.

Opposite free ends 17c of the sections of stationary sleeve shaft 17 may be of circular cross section machined fitted to liner bearings 22 and bearing blocks 14, integrally formed radial outwardly projecting thrust shoulders 17k being provided inwardly of said ends 17c and positioned within casing structure 21 as positive alignment means of said casing structure 21 with respect to said sleeve shaft 17 in the assembled apparatus 10 as shown in Fig. 1.

Integrally formed as part of sleeve shaft sections 17a and 17b are radially extending complementary bearing block lugs 17d and 17e, respectively, said lugs 17d and 17e being spaced apart to receive therebetween an intermediate driven gear 25, each of said lugs 17d and 17e being provided with a suitable anti-friction liner bearing 17f in which a shaft 24 is journalled to turn with said intermediate driven gear 25 mounted thereon. Also mounted to turn with gear shaft 24, in an overhanging position beyond lug 17e, is an intermediate drive gear 25a which meshes with an internal ring gear 26, the latter being rigid to an annular seat 21c integrally formed on the interior side of casing part 21b concentrically positioned with relation to said liner bearings 22.

The intermittent driven gear 25, is positioned to mesh with a drive gear 27 which is keyed to run with the power shaft 12, the latter having inner end 12b thereof journalled in a suitable roller thrust bearing 28 seated within sleeve shaft section 17b in a midportion of sleeve 17. The other end portion 12a of power shaft 12 inward of pulley 11 may also be journalled in a ball bearing 28a seated in bearing block 14, as shown in Fig. 1.

Casing structure sections 21a and 21b as seen in Fig. 1, are conical shaped and are provided on abutting ends thereof with mating peripherally extending outturned flanges 21d which through spaced apart bolts 29 are rigidly secured together by clamping between interiorly extending ring flanges 13b of the split pulley halves 13a, said assembly casing structure serving as a hub for take-off drive pulley 13.

To lubricate the gear transmission 20 within the casing structure 21 there may be provided a stationary pipe line 30 installed to extend horizontally through sleeve shaft section 17b and through bearing block 14 to the exterior thereof for connecting with a convenient oil supply source, such as oil cup 31. The sleeve shaft section 17b inside of casing structure 21 may be made with a suitable outlet opening 17g to permit dripping of a lubricant from pipe line 30 within sleeve section 17b into the casing structure 21 to reach the gear transmission 20. Said casing structure 21 thus forms a complete enclosure lubricating reservoir for said gear transmission 20 mounted to rotate with the driving pulley 13 on the sleeve shaft 17 as clear from Fig. 1. A suitable overflow hole and plug 21e may be provided in casing structure 21 for servicing the lubrication therein.

The practical operation of invention will now be apparent. With apparatus constructed as above described and assembled as shown in Figs. 1 and 2, rotary power applied to drive pulley 11 at a relatively high available speed, turns power shaft 12 which through the gearing transmission 20 above described rotates casing structure 21 carrying pulley 13 at a relatively lower speed at a range of more than 60 to 1 ratio speed reduction if desired. Not only can the relative diameter sizes of pulleys 11 and 13 be varied but also the gear reduction ratio of transmission 20 within the casing structure 21. The hollow sleeve section 17b may be provided with an offset portion 17h to provide sufficient clearance for proportionally larger drive gears than drive gear 27, said offset portion 17h also serving as an oil well for the gears of said transmission 20, shown in Fig. 1.

As frequently happens, apparatus 10 must be limited to have pulley 13 positively rotate in one direction only. The invention contemplates incorporating means to that end within the casing structure 21. As shown in Figs. 1 and 3, said directional rotary limiting means may comprise an annular toothed rack 33 which is secured by spaced bolts 34 to the interior side of the casing structure section 21b concentric with the axis of rotation of casing structure 21. Mounted on a projecting double arm fitting 35 from sleeve shaft section 17a are spaced apart dogs or pawls 36 and 37, which are pivoted with stub shafts 36a and 37a, respectively, so that at least one of said pawls is always effective to engage with said rack 33 for preventing the casing structure 21 with pulley 13 from turning except in one direction, as for example as shown in Fig. 3. Said stub shafts 36a and 37a may be journalled on opposite ends of each between arm 35a and 35b of fitting 35 on sleeve shaft section 17a as is clearly shown in Fig. 1. Fitting 35 with arms 35a and 35b may be formed integrally with sleeve.

Lubrication is supplied to apparatus 10 in the well understood manner through grease cups 23 and oil cup 31 and servicing can be conveniently and easily maintained by using overflow plug and hole 21e.

As seen from Figs. 1, 2 and 3, because the construction of apparatus 10 as described above with the casing structure 21 and sleeve shaft 17 made in sections 21a, 21b and sections 17a and 17b, respectively, with said sleeve section 17a and 17b secured together by bolts 18 and the casing structure sections 21a and 21b by bolts 29, the latter also clamping pulley halves 13a in position, said apparatus 10 can be easily assembled, taken apart for repairs or replacement, and reassembled requiring a minimum of skill, and for disassembly in changing the speed reduction ratio of gearing transmission 20 enclosed in the casing structure 21 without entirely dismantling said apparatus 10.

Apparatus 10 can also have the pulleys of relatively different diameter sizes with respect to pulleys 11 and 13 readily changed without disturbing the gearing transmission 20, pulley 11 being removable in the well understood manner, and pulley 13 by removing and replacing clamping bolts 29.

Apparatus 10 may also have the take-off drive in the form of a chain sprocket or cable groove pulley instead of belt pulley 13. Where a reduced speed chain take-off drive is required pulley 13 may be replaced by sprocket 113 secured by bolts 119 as shown in Fig. 4. And where a cable take-off drive is desired the pulley 13 or sprocket 113 may be replaced by grooved pulley 213 secured in place by bolts 219 as shown in Fig. 5.

It is, therefore, seen that there is provided an improved power transmission in which the several objects of the invention are achieved and which are well adapted to meet the conditions of practical use. As various other possible embodiments may be made in the above invention, and as various changes may be made in the embodiments above set forth, it is to be understood that all matters herein set forth and shown in the accompanying drawings are to be interpreted as illustrative and not in a limiting sense.

Having thus described my invention, I claim as new and desire to secure by Letters Patent:

1. In a rotary reducing speed power transmission apparatus of the character described, an elongated hollow sleeve shaft sectionalized for disassembly splitting having mating flanges at a midportion thereof, means for releasably retaining said flanges together to make said sectionalized shaft provide a continuous rigid spanning structure when supported at the ends thereof, spaced integrally formed thrust shoulders projecting radially outward from said shaft structure and inwardly of the ends thereof, and complementary spaced apart radially extending bearing block lugs formed as part of each section of the shaft structure for mounting therebetween a gear of a power transmission, one section of said shaft having a portion between the said flange and the thrust shoulder offset with respect to an axis of alignment of the hollow sleeve shaft to provide an oil well and clearance for a gear of said power transmission, a lubricating pipe extends into said last mentioned shaft section, the latter having an opening communicating with the exterior of said section wherethrough a lubricant fed by said pipe passes.

2. In a rotary reducing speed power transmission apparatus, an elongated hollow shaft as defined in claim 1, in which the other section of said sleeve shaft includes an integrally formed double arm fitting for mounting parts of a rotary direction control means thereon.

GEORGE E. CONWAY.

REFERENCES CITED

The following references are of record in the file of this patent:

UNITED STATES PATENTS

| Number | Name | Date |
| --- | --- | --- |
| 982,077 | Liaci et al. | Jan. 17, 1910 |
| 1,134,772 | Sundh | Apr. 6, 1915 |
| 1,836,225 | Christensen | Dec. 15, 1931 |
| 2,439,521 | Miller | Apr. 13, 1948 |